(12) United States Patent
Lee

(10) Patent No.: US 10,782,863 B2
(45) Date of Patent: Sep. 22, 2020

(54) CONTROL INTERFACE

(71) Applicant: Samsung Electronics Co., Ltd., Suwon-si, Gyeonggi-do (KR)

(72) Inventor: Chunkwok Lee, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 704 days.

(21) Appl. No.: 14/857,664

(22) Filed: Sep. 17, 2015

(65) Prior Publication Data

US 2017/0017384 A1 Jan. 19, 2017

Related U.S. Application Data

(60) Provisional application No. 62/194,157, filed on Jul. 17, 2015.

(51) Int. Cl.
| | | |
|---|---|---|
| *G06F 3/0484* | (2013.01) | |
| *G06F 3/0488* | (2013.01) | |
| *G06F 3/0482* | (2013.01) | |
| *G06F 3/0481* | (2013.01) | |
| *F24C 7/08* | (2006.01) | |

(52) U.S. Cl.
CPC .......... *G06F 3/04847* (2013.01); *F24C 7/085* (2013.01); *F24C 7/086* (2013.01); *G06F 3/0482* (2013.01); *G06F 3/0488* (2013.01); *G06F 3/04812* (2013.01); *G06F 3/04842* (2013.01); *G06F 3/04845* (2013.01); *G06F 3/04883* (2013.01)

(58) Field of Classification Search
CPC ............... G06F 3/04847; G06F 3/0488; G06F 3/04883; G06F 3/0482; G06F 3/04812; G06F 3/04842; G06F 3/04845; F24C 7/085; F24C 7/086
See application file for complete search history.

(56) References Cited

U.S. PATENT DOCUMENTS

| | | | | |
|---|---|---|---|---|
| 4,394,557 | A * | 7/1983 | Tachihara | H05B 6/6426 219/492 |
| 8,555,776 | B2 | 10/2013 | Murphy et al. | |
| 8,929,724 | B1 | 1/2015 | Mograbi | |
| 2002/0126586 | A1* | 9/2002 | Hamberg | G04F 1/005 368/113 |
| 2003/0146201 | A1 | 8/2003 | Smith et al. | |
| 2003/0146205 | A1 | 8/2003 | Rael et al. | |

(Continued)

OTHER PUBLICATIONS

M. Emre Soyak, "Oven Lcd Interface", 2013, http://emresoyak.com/oven-lcd-interface, pp. 1-15. (Year: 2013).*

(Continued)

*Primary Examiner* — Jennifer N To
*Assistant Examiner* — Ashley M Fortino

(57) ABSTRACT

In one aspect, a method for adjusting one or more parameters using an interface will be described. A contact point on a display is detected. A parameter is adjusted based on a distance between a reference point and the contact point. A second parameter is adjusted based on an angle between a base line and a contact line. The base line is a reference line that extends from the reference point. The contact line is a reference line that connects the contact point with the reference point. Various systems, devices and software are described that help implement the above method.

20 Claims, 12 Drawing Sheets

(56) References Cited

U.S. PATENT DOCUMENTS

| | | |
|---|---|---|
| 2004/0016348 A1 | 1/2004 | Sharpe |
| 2005/0218139 A1 | 10/2005 | Cavada et al. |
| 2005/0237217 A1 | 10/2005 | Rudolph et al. |
| 2005/0273553 A1 | 12/2005 | Boucard |
| 2006/0025218 A1* | 2/2006 | Hotta ................ A63F 13/06 463/37 |
| 2007/0045284 A1 | 3/2007 | Balk et al. |
| 2008/0276203 A1 | 11/2008 | Santinato et al. |
| 2010/0147823 A1 | 6/2010 | Anderson et al. |
| 2010/0153030 A1 | 6/2010 | Yatir et al. |
| 2010/0186600 A1 | 7/2010 | Lewis et al. |
| 2011/0102464 A1 | 5/2011 | Godavari |
| 2012/0251695 A1 | 10/2012 | Neff et al. |
| 2013/0092680 A1 | 4/2013 | Cartwright et al. |
| 2013/0174440 A1 | 7/2013 | Tousimis |
| 2013/0277353 A1 | 10/2013 | Joseph et al. |
| 2014/0137042 A1* | 5/2014 | Du ................... G06F 3/0482 715/834 |
| 2014/0173519 A1* | 6/2014 | Sassi ................. H04S 1/002 715/833 |
| 2014/0201664 A1 | 7/2014 | Guilleminot et al. |
| 2014/0359508 A1 | 12/2014 | Otero Diaz et al. |
| 2015/0049063 A1* | 2/2015 | Smith ................ G06F 3/0421 345/175 |
| 2016/0150265 A1* | 5/2016 | Choi ................. G06F 3/0482 725/52 |

OTHER PUBLICATIONS

International Search Report dated Aug. 24, 2016 from PCT Application No. PCT/KR2016/005874.

Written Opinion dated Aug. 24, 2016 from PCT Application No. PCT/KR2016/005874.

* cited by examiner

CONTROL INTERFACE

CROSS-REFERENCE TO RELATED APPLICATIONS

This application claims the priority of U.S. Provisional Patent Application No. 62/194,157, entitled "Adjustment of Time Duration and Temperature Using a Digital User Interface," filed Jul. 17, 2015, which is incorporated herein its entirety for all purposes.

FIELD OF THE INVENTION

The present invention relates generally to an interface. In various embodiments, the interface allows a user to control two or more parameters by moving a contact point on the interface.

BACKGROUND

Many ovens have a variety of buttons and/or a keypad, which are used to provide input to the oven. For example, in some ovens, a user first pushes a start/bake button, and then types in a desired temperature (e.g., 350°.) Then, the user types in a cooking time. In some implementations, the user uses the keypad to type in a desired cooking time. Alternatively, the user may repeatedly press a button to increase or reduce the cooking time in fixed increments (e.g., press a button to increase the cooking time by 1 minute and another button to reduce it by 1 minute.)

Although the above methods work well for various applications, there are ongoing efforts to improve user interfaces for ovens, kitchen appliances and other devices.

SUMMARY

In one aspect, a method for adjusting one or more parameters using an interface will be described. A contact point on a display is detected. A parameter is adjusted based on a distance between a reference point and the contact point. A second parameter is adjusted based on an angle between a base line and a contact line. The base line is a reference line that extends from the reference point. The contact line is a reference line that connects the contact point with the reference point. Various implementations of the present invention relate to arrangements, systems, devices and software that are arranged to implement the above method.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Various embodiments of the present invention relate to a user interface. In some implementations, the interface allows a user to adjust two or more parameters for a device or appliance using a touch-sensitive interface or gesture.

Figure 1:
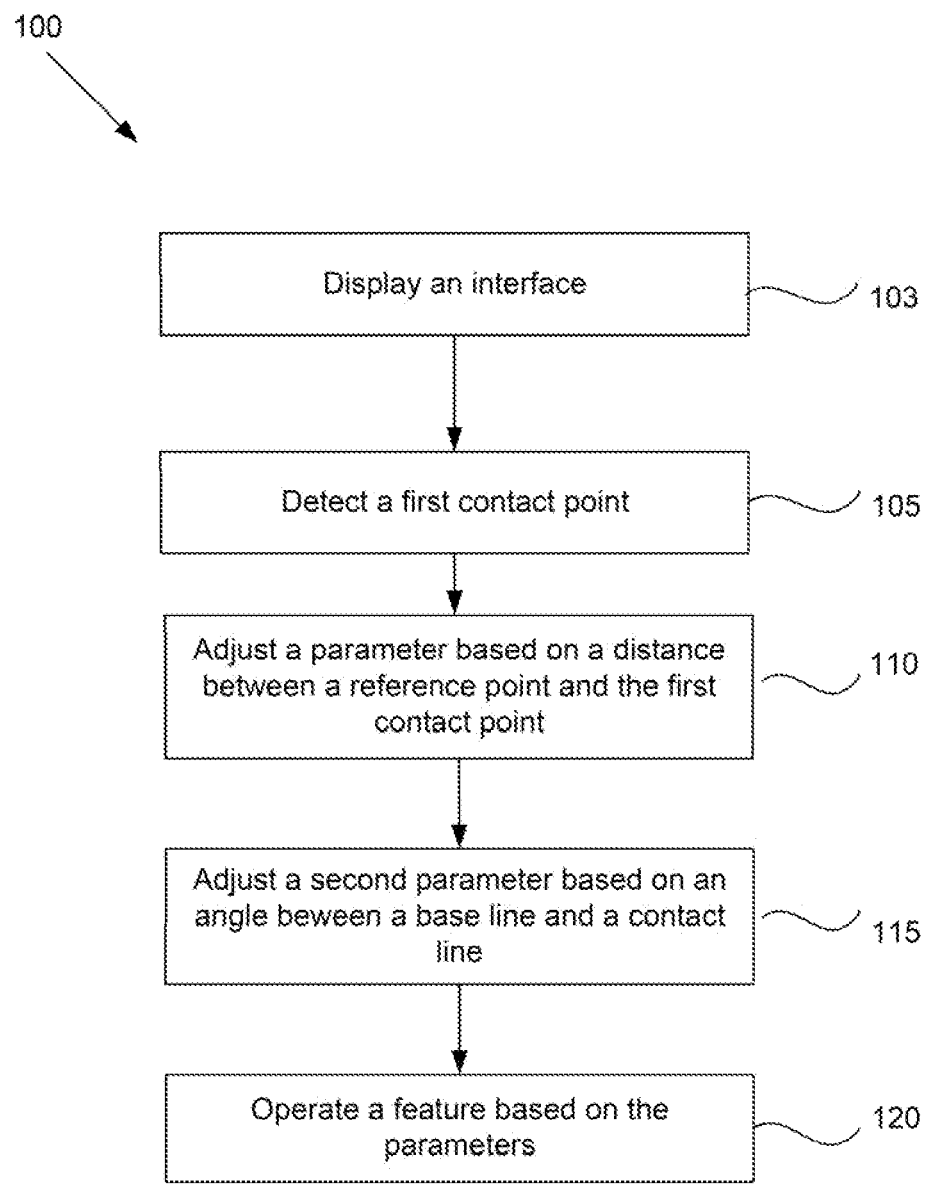
FIG. 1 is a flow diagram of a method for adjusting parameters using an interface according to a particular embodiment of the present invention.
Figure 2A:
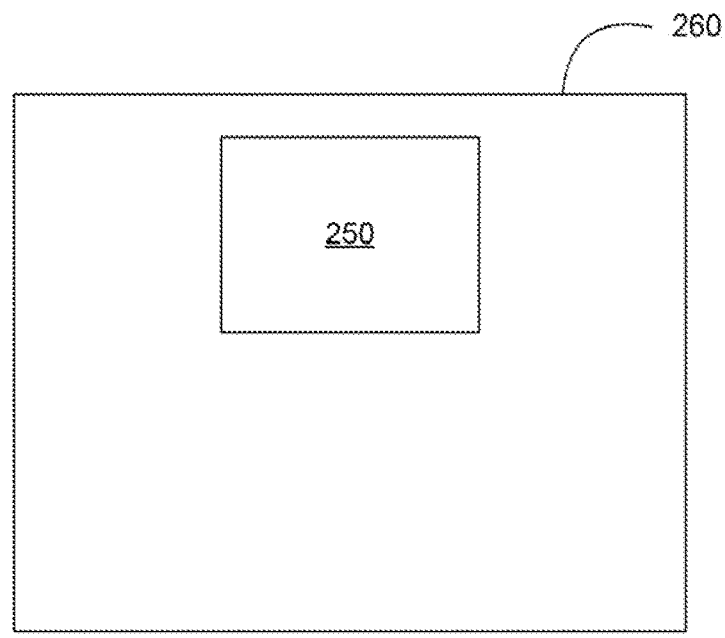
FIG. 2A is a diagram of a device according to a particular embodiment of the present invention.

Referring initially to FIG. 1, a method 100 for adjusting parameters using an interface according to a particular embodiment of the present invention will be described. The method may be implemented by any suitable device, including but not limited to a gas/electric oven, a microwave oven, an appliance, a computer, a laptop, a mobile phone, a smart watch, etc. A device 260, which is illustrated in FIG. 2A, implements the method 100. In this example, the device 260 is an oven that includes a display screen 250. A user is able to provide input to the device 260 by touching or manipulating an interface 200 on the display screen 250, as described below.

Figure 2B:
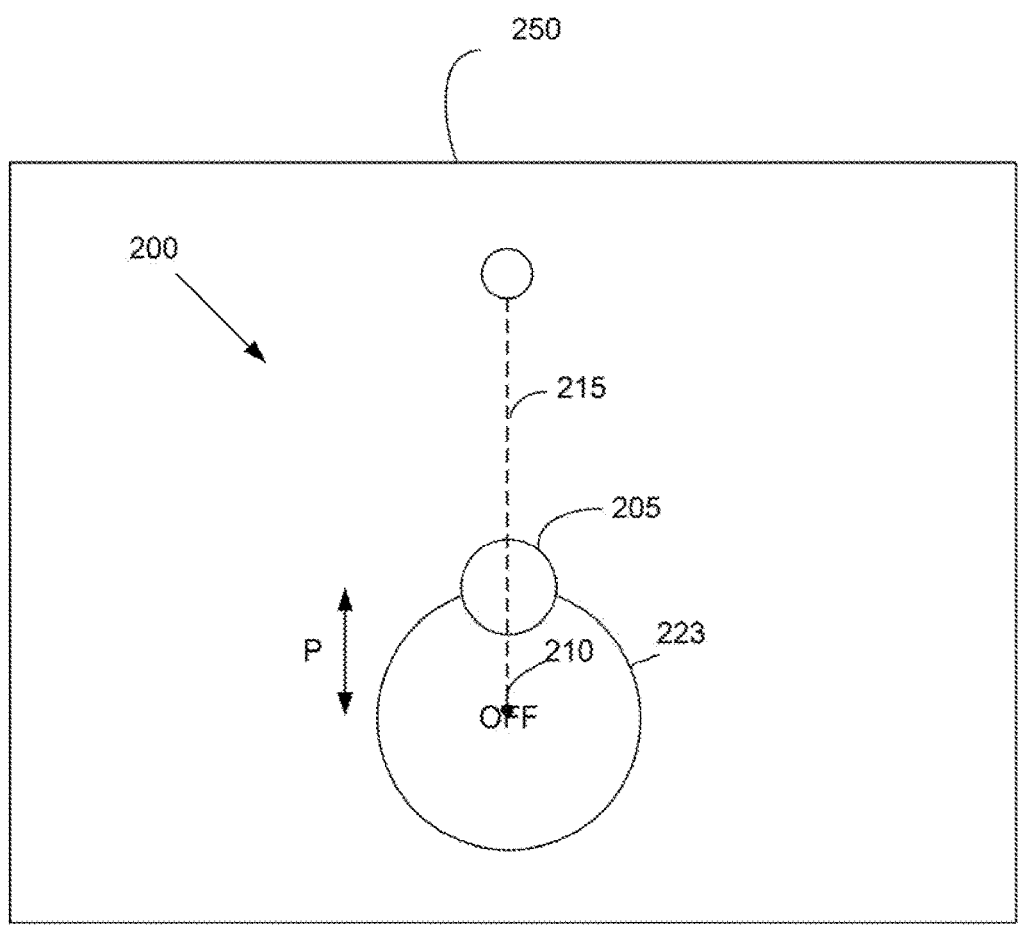
FIG. 2B is a diagram of an interface according to a particular embodiment of the present invention.

At step 103, the device 260 displays a graphical interface 200 at the display screen 250. The device 260 may display a wide variety of different interfaces, depending on the needs of a particular application. One example of a possible interface 200 is illustrated in FIG. 2B. The interface 200 illustrated in FIG. 2B includes an information panel 223, a reference point 210 and a base line 215.

The information panel 223, which is optional, is a region of the interface 200 that provides information regarding the status or operations of the device. In this example, the information panel indicates "off," as the oven in this example is not currently in operation.

The base line 215 is a reference line on the interface that extends from the reference point 210 and is used to help control the interface 200. (The effect of the base line 215 on the adjustment of parameters will be described later in this application.) The base line 215 may be arranged in a variety of ways. In the illustrated embodiment, for example, the base line 215 extends vertically e.g., extends perpendicular to the edge of the display screen 250 on the device 260. In other embodiments, the base line 215 can extend in any direction.

The reference point 210 may also be arranged in a variety of ways. In the illustrated embodiment, for example, it is positioned at the center of the interface 200 and/or of the information panel 223. It should be appreciated that in some embodiments, the reference point 210 and the base line 215 are reference objects that do not have a visual form and are not displayed. In other embodiments, however, they correspond to a line, point or marker that is visible on the display.

At step 105, the device 260 detects a contact point 205. A contact point is understood as a point, region or location at which an external structure (e.g., a finger of a user, a pen, etc.) comes in contact with the interface on the device 260. Generally, a user is causing the contact to occur in order to provide input to the device 260 through the interface 200. The display screen 250 and device 260 are configured to detect the location and movement of the contact point 205 e.g., using a capacitive touch-sensitive display or any other suitable touch-sensitive technology.

It should be noted that in some embodiments, the interface 200 includes a contact marker. A contact marker is any type of visual marker that tracks, follows or indicates where a user has come in contact with the interface 200 and display screen 250. The user may move the contact point/marker to provide input to the device 260. In the illustrated embodiment, for example, the contact marker is a circle that indicates a point on the screen that a finger of a user (or other structure) comes in contact with the interface 200. In some implementations, the user moves the marker to different locations on the display by sliding the finger (i.e., dragging the marker) across the interface. When the finger breaks contact from the interface, the marker continues to be displayed at the position it was in when the finger was still in touch with the marker.

In some embodiments, if the user touches a part of an interface without a marker, there is no effect. That is, the user must first touch the marker and then move the marker to provide input to the interface 200 and the device. In other embodiments, however, if a user touches a different part of the display, the contact marker will disappear and reappear at that part of the display. Thus, the contact marker indicates a point on the display where the user last came in contact with the interface. It should be appreciated that in the figures, any references to a contact point or the movement of a contact point may be understood to refer also to a contact marker and the movement of a contact marker by a user i.e., by touching and dragging the contact marker across the interface 200. However, it should be appreciated that the display and use of a contact marker is optional and not required to provide input to the device 260.

Figure 3A:
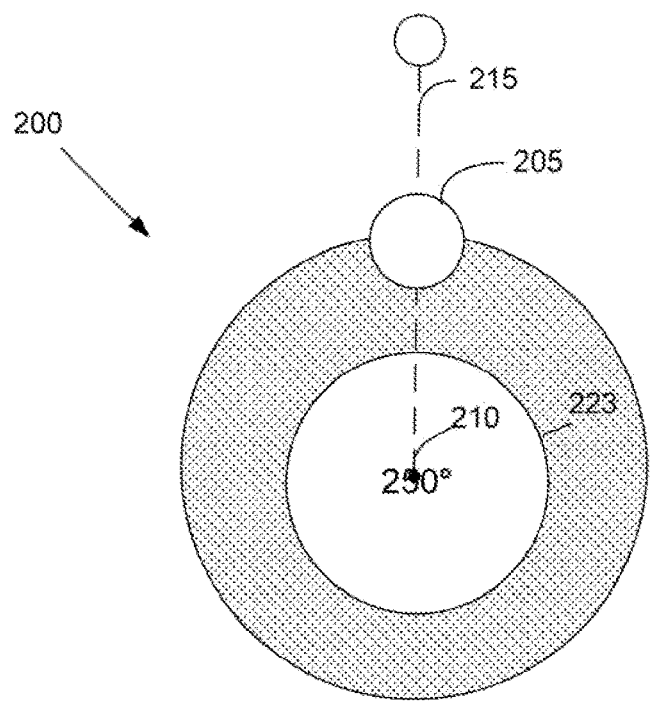
FIGS. 3A and 3B are diagrams of an interface used to adjust a first parameter according to a particular embodiment of the present invention.

Returning to FIG. 1, at step 110, the device 260 adjusts a parameter based on a distance between the reference point 210 and the contact point 205. (This parameter is referred to hereinafter as the first parameter.) An example of this is illustrated in FIG. 3A. In FIG. 3A, the device 260 detects that a user has moved the contact point 205 from its position in FIG. 2B to a new position illustrated in FIG. 3A. That is, the contact point 205 has been moved vertically and exactly along the base line 215, so that the distance between the reference point 210 and the contact point 205 has increased.

The device 260 detects the above motion and adjusts a first parameter based on the aforementioned distance. The first parameter may vary widely, depending on the nature of the device 260 and the application. In the illustrated embodiment, for example, the device 260 is an oven and the adjusted first parameter is oven temperature. That is, by the sliding a finger across the display 250 as described above and increasing the distance between the contact point 205 and the reference point 210, the user is increasing the cooking temperature setting for the oven, from 0° to 250°. In other applications, the adjusted parameter may control a different setting or feature e.g., power level, mass/weight (e.g., for a defrost mode), etc.

Figure 3B:
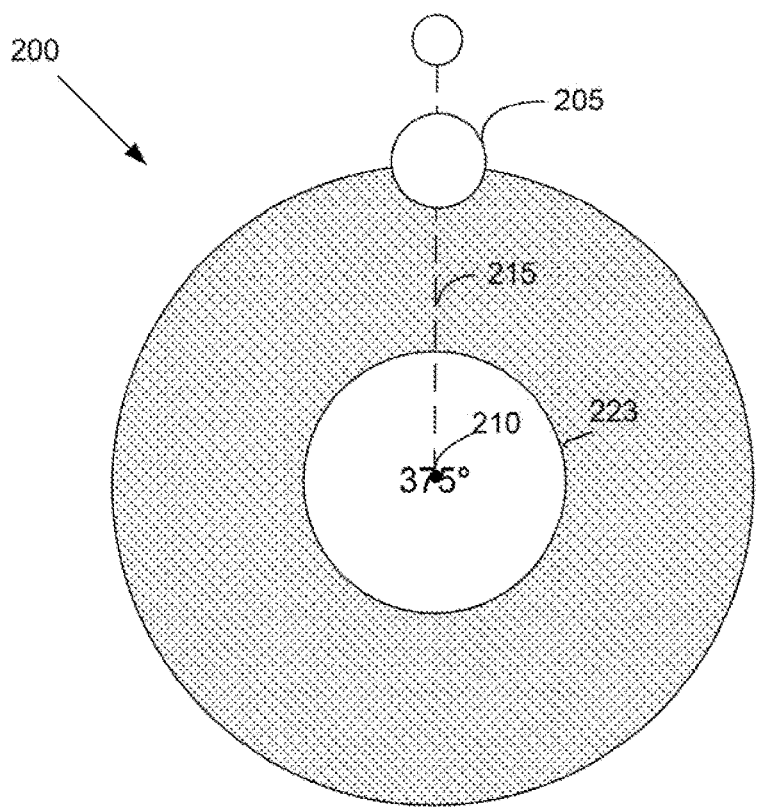

The contact point 205 can be moved again to further adjust the first parameter, as indicated by FIG. 3B. FIG. 3B illustrates the interface 200 after the user has moved the contact point 205 from its position in FIG. 3A to the new position illustrated in FIG. 3B. The device 260 detects this change and further detects that the distance between the contact point 205 and the reference point 210 has grown. Accordingly, the associated first parameter is changed. In this case, the cooking temperature setting increased from 250° to 375°. In various embodiments, the change in the parameter is (directly) proportional to the change in the distance between the reference point 210 and the contact point 205, although this is not a requirement.

In the above examples, the first parameter increases as the distance between the contact point 205 and the reference point 210 increases. Although this works well for many applications, it is not an absolute requirement. That is, in some approaches, the first parameter increases when the distance between the contact point 205 and the reference point 210 decreases. It should further be noted that when the first parameter is 0, this does not necessarily mean that the distance between contact point 205 and the reference point 210 is 0. For example, in the embodiment illustrated in FIG. 2, the device 260 determines that when the contact point 205 is a distance P from the reference point 210, the first parameter (e.g., cooking temperature) should be set to OFF (e.g., 0°.) (In the figure, the distance P is the radius of a circular information panel 223, where any adjustments in the parameters are continuously updated and displayed.) In some embodiments, the first parameter (e.g., cooking temperature) is directly proportional to or based on D-P, where D is the total distance between the reference point 210 and the contact point 205.

Figure 4A:
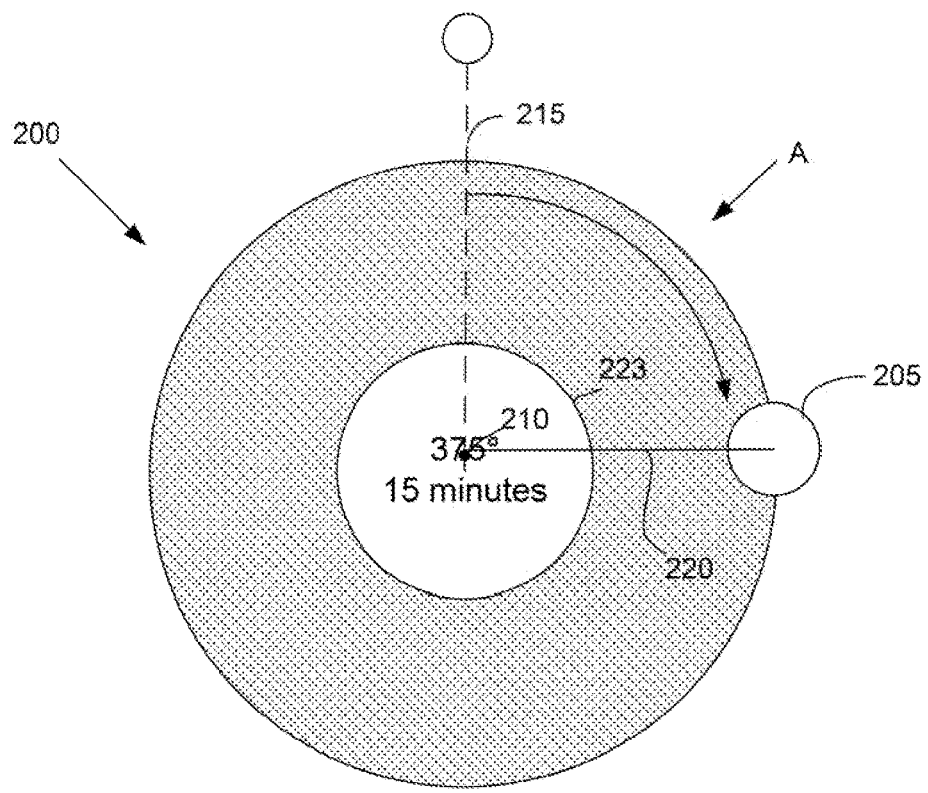
FIGS. 4A and 4B are diagrams of an interface used to adjust a second parameter according to a particular embodiment of the present invention.

At step 115 of FIG. 1, the device 260 adjusts a second parameter based on an angle between a base line 215 and a contact line 220. FIG. 4A describes an example of this operation. In FIG. 4A, the user moves the contact point 205 from its position in FIG. 3B to a new position illustrated in FIG. 4A.

The contact line 220 is a reference line that extends from the reference point 210 and/or connects the reference point 210 to the contact point 205. In FIG. 4A, the contact point 205 has been repositioned such that the angle A between the contact line 220 and the base line 215 is 90°. Earlier, in the step shown in FIG. 3B, the contact line 220 was coincident with or superimposed over the base line 215. Put another way, the angle between the contact line 220 and the base line 215 was 0°. It should be noted that in some embodiments, the contact line 220 is displayed or marked in the interface 200, while in other embodiments, the contact line 220 is a reference line that is not visible and is not displayed.

When the device 260 detects that the angle A between the base line 215 and the contact line 220 has increased (e.g., from 0 to 90°), the device 260 adjusts a second parameter based on the angle A. This second parameter may be any suitable parameter e.g., time, temperature, power level, mass/weight, etc. In the illustrated embodiment, the second parameter is cooking time. Thus, when the contact point 205 is moved to the new position such that the angle A changes from 0° to 90°, the cooking time is increased from 0 (i.e., timer off) to 15 minutes. It should be note that this approach for setting the time is highly intuitive, since it uses the same increments of time found in a clock face i.e., a quarter of a circle corresponds to 15 minutes.

Figure 4B:
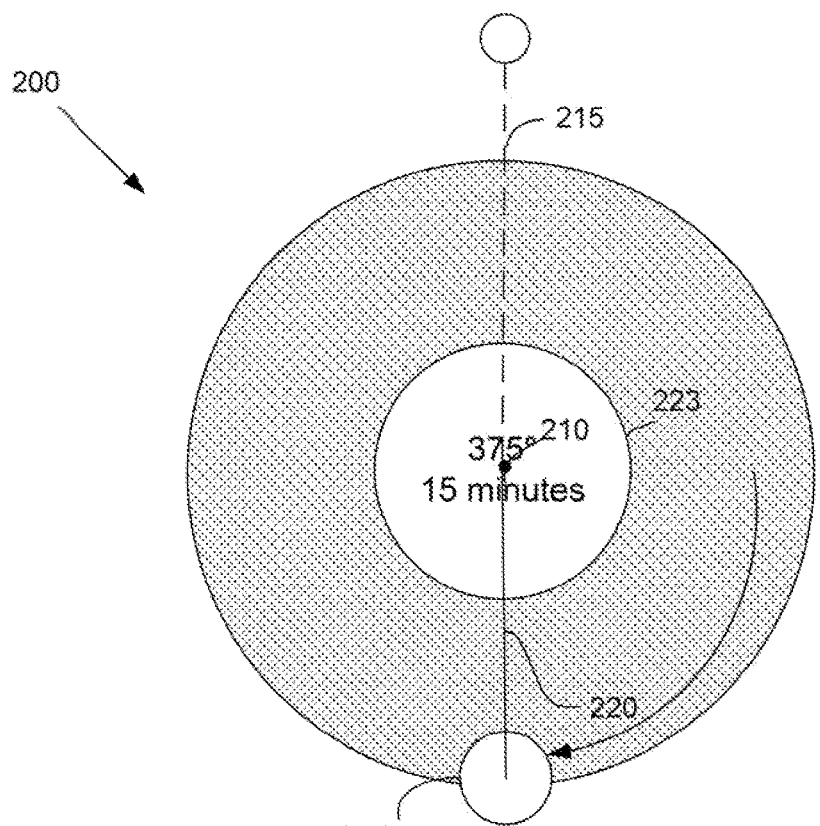

FIG. 4B illustrates an example in which the contact point 205 is moved another 90° relative to its position in FIG. 4A. The device 260 detects that the angle between the base line 215 and the contact line 220 has increased from 90° to 180°. Thus, the second parameter (e.g., time) is increased as well (e.g., from 15 to 30 minutes.) The adjusted second parameter is displayed in the information panel 223.

It should be noted that in the examples illustrated in FIGS. 4A and 4B, the angle between the contact line 220 and the base line 215 changes, but the distance between the contact point 205 and the reference point 210 stays the same. Thus, the parameter adjusted in step 110 (e.g., temperature) stays the same while the second parameter changes based on the angle. In FIGS. 3A and 3B the reverse was true—that is, the angle between the contact line 220 and the base line 215 remained the same (e.g., 0°) and the distance between the contact point 205 and the reference point 210 changed between FIGS. 3A and 3B. Thus, the second parameter remained the same, while the first parameter (e.g., temperature) changed.

Figure 5A:
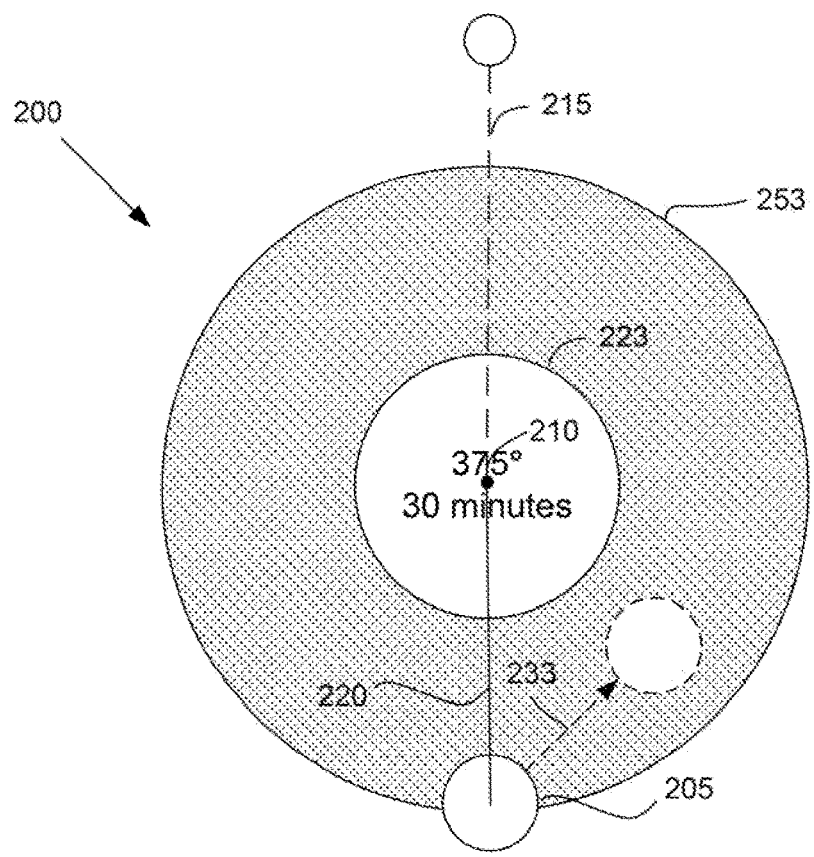
FIGS. 5A and 5B are diagrams of an interface used to move a contact point according to a particular embodiment of the present invention.
Figure 5B:
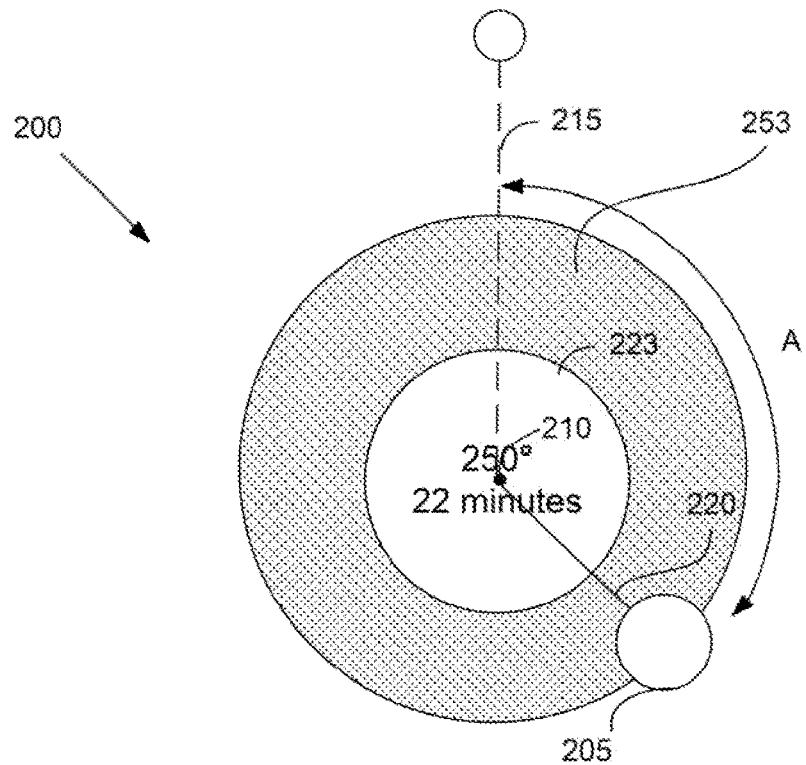

In the above examples for the sake of clarity, only one parameter was changed at a time by a particular motion. However, many types of motions will change both parameters at (substantially) the same time. An example of this is shown in FIGS. 5A and 5B. In FIG. 5A, the user moves a contact point 205 from its position in FIG. 4B to a new position as illustrated in FIG. 5A. The movement is indicated by the arrow 233.

The device 260 detects the motion of the contact point 205, which may be caused by the user dragging his or her finger over the display along the path outlined by the arrow 233. As the user does this, the first and second parameters are dynamically being adjusted. That is, the device 260 tracks the motion and determines, based on a current new position of the contact point 205, what the new distance between the reference point 210 and the contact point 205 is. If the new distance is different from what it was previously, the device 260 adjusts the first parameter based on the distance (e.g., step 110). The device 260 also determines, based on the current new position of the contact point 206, what the angle is between the new contact line 220 and the base line 215. If the new angle is different what it was previously, the device 260 adjusts the first parameter based on the new angle (e.g., step 115.) The above determinations are repeated at multiple points (e.g., at each dash making up the arrow 233) as the contact point 205 moves towards its new location. (It should be noted that only a few points/dashes are shown for the sake of clarity, but adjustments may take place more frequently at a much greater number of points.) In the illustrated embodiment, each updating of the parameters is displayed in the information panel 223.

FIG. 5B illustrates the contact point 205 when it arrives at its new location, as well as the corresponding changes in the first and second parameters, which are displayed in the information panel 223. In FIG. 5A, the first parameter (e.g., temperature) was 375° and the second parameter (e.g., time) was 30 minutes. In FIG. 5B, due to a decrease in the distance between the contact point 205 and the reference point 210, the temperature has dropped to 250°. In FIG. 5A, the second parameter (e.g., time) was 30 minutes. In FIG. 5B, due to a decrease in the angle between the contact line 220 and the base line 215, the time has dropped to 22 minutes. Thus, in this example, the device 260 has detected a single continuous movement by the user (e.g., a dragging of the finger across the screen), and based on that movement, has concurrently adjusted the two aforementioned parameters. For various applications, this is a more intuitive and efficient way of resetting two parameters than, for example, inputting numbers one digit at a time, as is done in many prior art oven interfaces.

In the above examples, the second parameter (e.g., time) increases when the contact point 205 is moved in a clockwise direction. However, this is not a requirement. That is, in some applications, the second parameter increases when the contact point 205 is moved in the opposite (i.e., counterclockwise) direction relative to the reference point 210. Put another way, in some embodiments, if A is the angle between the contact line 220 and the base line 215, the second parameter may be based and/or (directly) proportional to A or 360-A.

As the contact point 205 is moved from one position to another, a variety of optional graphical effects may be displayed to help mark the change in the parameters. In the embodiment illustrated in FIGS. 5A and 5B, for example, there is a circular region 253 whose center is at the reference point 210. The region 253 is shaded or colored in the display so that it is distinguishable from the background. As the user moves the contact point 205 such that the distance between the reference point 210 and the contact point 205 decreases or increases, the device 260 displays and/or animates the radius of the circular region 253 as shrinking or increasing, respectively. In various embodiments, the radius of the circular region 253 is based on, directly proportional to and/or (substantially) equal to the distance between the reference point 210 and the (center of the) contact point 205. In these figures, the circular region 253 forms a full circle. However, in other embodiments, only a partial circle (e.g., a pie slice or wedge) is displayed (e.g., only a region that covers angle A and/or whose borders are at least in part defined by the contact line 220 and the base line 215.)

Returning to method 100 of FIG. 1, at step 120, the device 260 then operates one or more features or functions at the device 260 based on the adjusted first and second parameters. That is, the adjusted parameters are used to perform an operation. A wide variety of operations may be performed, depending on the nature of the device 260 and the first and second parameters.

In the above examples, the device 260 is an oven and the first and second parameters refer to a cooking temperature and a cooking time respectively. In some oven-based implementations, once the first and second parameters are adjusted (e.g., steps 110 and 115), the device 260 then causes the heating of a heating element in an interior cooking compartment of the oven. The heating element is heated such that the temperature of the air in the interior cooking department reaches the adjusted cooking temperature (e.g., the first parameter as determined in step 110). Additionally, the device starts a timer, which expires after a time period equal to the adjusted cooking time (i.e., the second parameter as determined in step 115) has passed. In various implementations, the expiration of the timer causes the heating of the heating element to end.

Some implementations involve using the interface 200 on a device 260 to control another device. By way of example, the interface 200 described above in connection with steps 105, 110 and 115 may be displayed on a display device, including but not limited to a mobile phone, a personal digital assistant, a laptop, a tablet, or any other electronic or computing device. Once the display device adjusts the first and second parameters as described above, the control device transmits them over a network (e.g., a WiFi network, a cell phone network, the Internet, etc.) to an implementation device (e.g., an oven or any other appliance.) The implementation device then performs operations based on the received parameters (i.e., step 120).

FIGS. 6-11 illustrate additional interfaces according to various embodiments of the present invention. Each interface may include the features or functionality of any interface described in connection with FIGS. 1-5B. That is, any component of the interfaces in FIGS. 6-11 (e.g., base line, reference point, contact point, etc.) may function in a similar or the same manner as a corresponding component in any of the FIGS. 1-5B. The interfaces of FIGS. 6-11 may be displayed on any suitable device e.g., device 260 of FIG. 2, device 1200 of FIG. 12, a mobile phone, a tablet, a computer, a laptop, etc.

Figure 6:
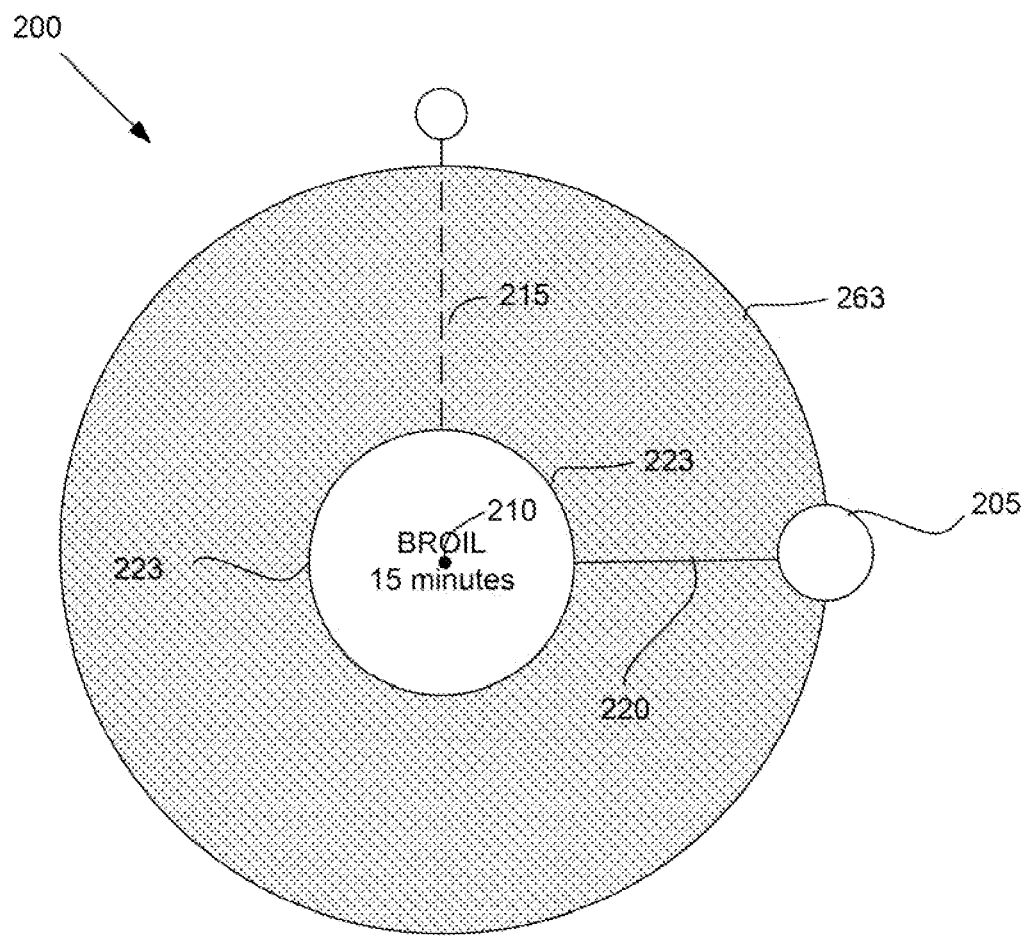
FIG. 6 is a diagram of an interface used to select a mode of operation according to a particular embodiment of the present invention.

Referring to FIG. 6, an example interface 200 will be described. With the interface 200, a user can cause the device 260 to operate in a different mode by moving a contact point 205 to a predetermined location on the interface 200. The interface 200 is a graphical user interface that is displayed on a device 260. In this example, the device 260 is an oven, although any suitable type of device (e.g., a laptop, mobile phone, tablet, etc.) may also be used. The interface 200 includes a reference point 210, a contact point movement region 263, an information panel 223, a base line 215 and a contact line 220.

The contact point movement region 263 is a region of the interface 200 where a contact point can be moved. In some embodiments, the contact point is indicated by a contact marker, and the contact marker can be moved within the contact point movement region 263, but not outside the contact point movement region 263. Put another way, contact point/marker movement within the region 263 adjusts the first and second parameters, but contact points outside the region 263 has no effect on the parameters.

The region 263 may have any shape or form. In the illustrated embodiment, for example, the contact point movement region 263 has a circular shape whose radius is predetermined and whose center is the reference point 210. Various implementations involve a contact point movement region 263 that is shaded and/or has a particular color that helps defines the periphery or border of the contact point movement region 263. In other approaches, the contact point movement region 263 is not displayed or visually apparent.

In the illustrated example, a user moves the contact point/marker to the outer periphery or border of the contact point movement region 263. The device detects this motion and in response, causes the device 260 to adjust a parameter or a setting of the device 260 such that the device enters or will enter a particular operational mode. This operational mode may involve any change in the operations of the device 260. In the illustrated embodiment, for example, the above movement of the contact point 205 to the outer edge of the contact point movement region 263 causes the device (e.g., oven) to enter or prepare to enter a broil mode. When this happen, the first parameter (e.g., a specific user-defined cooking temperature) is no longer used to control the heating element in the oven. In this example, the device 260 still adjusts the second parameter (e.g., cooking time) based on an angle between the base line 215 and the contact line 205, as previously described (e.g., step 115). Thus, in the illustrated embodiment, since this angle is approximately 45°, the time is set to 15 minutes, as indicated by the information panel 223.

In this example, once the user has positioned contact point 205 at the periphery of the contact point movement region 263, the user provides input to the device 260 indicating that he or she wants to initiate the cooking process using the selected parameters. In response to the input and/or the contact point position/movement, the device 260 heats an interior compartment using the selected operational mode (e.g., broil mode). In this example, the broil mode continues for a time period based on the angle between the base line 215 and the contact line 220 e.g., as discussed in connection with step 115 of FIG. 1.

The above example involves a user who moves a contact point 205 to the periphery of the contact point movement region 263 to help initiate a broil mode. However, in other embodiments, the user can move to the contact point 205 to other locations in order to trigger a variety of different operational modes. In some designs, for example, particular operation modes are triggered when the user moves the contact point 205/contact marker to the reference point 210, the (periphery of the) information panel 233 or any other suitable location.

Figure 7A:
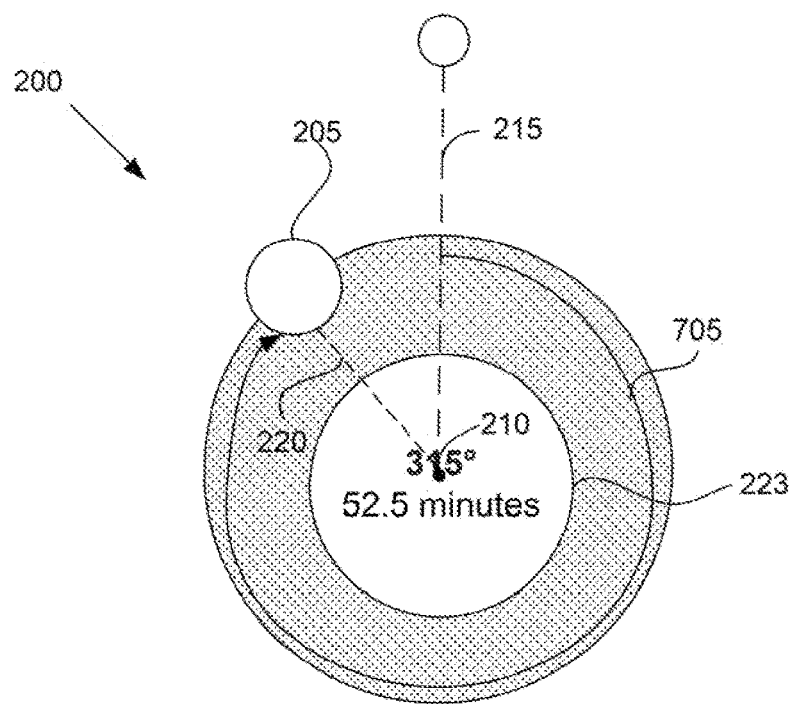
FIGS. 7A and 7B are diagrams of an interface in which a contact point is rotated 360° around a reference point according to a particular embodiment of the present invention.
Figure 7B:
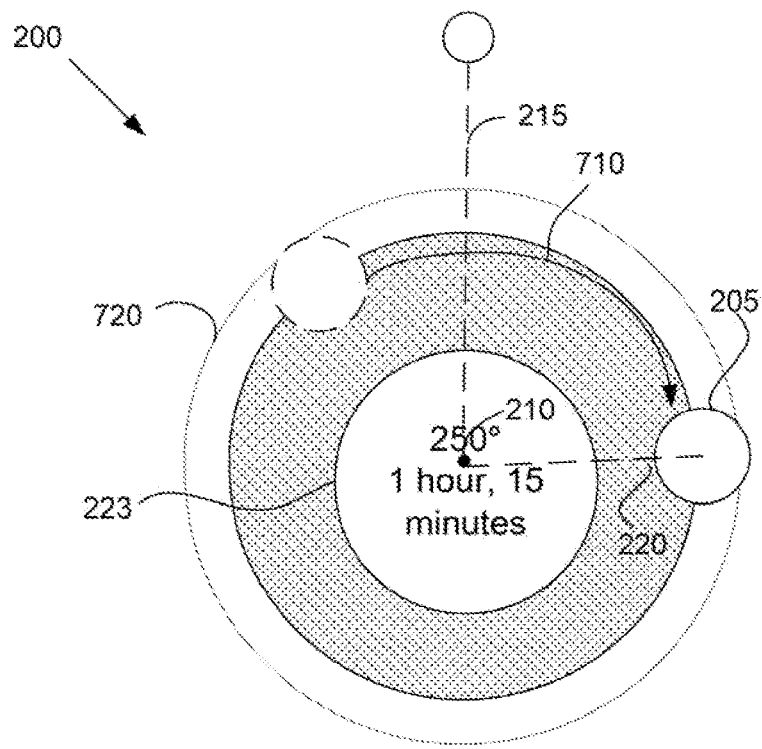

Referring next to FIGS. 7A and 7B, an example method for setting a time period using an interface 200 will be described. FIG. 7A illustrates a graphical user interface that may have the features and functionality of any interface illustrated in FIGS. 1-6. The interface 200 includes a base line 215, a contact line 220 and a reference point 210. In the illustrated embodiment, the interface 200 is displayed on and/or used to control a device 260 (i.e., in this example, an oven.) As previously described, the device 260 adjusts a first parameter (e.g., cooking temperature) and a second parameter (e.g., cooking time) based on the base line 215, the contact line 205, the reference point 210 and/or the contact point 205.

In the example illustrated in FIG. 7A, it should be noted that the second parameter (e.g., cooking time) is directly proportional to the angle between the base line 215 and the contact line 220. Put another way, if the contact point 205 is rotated clockwise 360° around the reference point 210, the device 260 will increase the second parameter (e.g., cooking time) by 60 minutes. If the contact point is rotated only 180° (half of 360°), then accordingly the increase in the cooking time would be ½*60=30 minutes. It should be noted that the above relationship between the angle and the second parameter is not a requirement for all implementations, although it is helpful in understanding this particular example.

In FIG. 7A, a user has moved the contact point 205 in a clockwise direction from the base line 215. (The path of the motion of the contact point 205 is indicated by the arrow 705.) In this example, the device 260 detects the clockwise movement and increases the second parameter (e.g., time) to 52.5 minutes, since the angle between the base line and the contact line is approximately 315°. The adjusted time is displayed in the information panel 223 (e.g., step 115 of FIG. 1.)

In FIG. 7B, as indicated by the arrow, the user continues moving the contact point 205 from its position in FIG. 7A to a new position in FIG. 7B. The new position is approximately 45° past the base line 215, as shown in the figure. As a result, the contact point 205 has rotated around the reference point 210 more than 360° in total i.e., 315° plus an additional 135°. The device 260 tracks the history of the movement of the contact point 205 as it has moved 450° around the reference point. Based on the above tracked motion, the device 260 increases the cooking time (second parameter) to 1 hour and fifteen minutes, as indicated in the information panel 223.

It should be noted that in this embodiment, the device 260 does not determine the cooking time (second parameter) based only on the current position of the contact point 205. (If that were the case, the cooking time could also be 15 minutes, since at the new position, the angle between the base line 215 and the contact line 220 is 45°.) Rather, in this example, the device 260 sets or adjusts the cooking time based on a stored history of the net angular rotation of the contact point 205 in a clockwise direction around the reference point 210. That is, in this particular example, the device 260 tracks the motion of the contact point 450° around the reference point 210, and then adjusts the cooking time based on the net angular rotation of 450°. If the history indicated that the contact point was rotated 450° in a clockwise direction, and then 135 degrees in a counterclockwise direction, then the net angular rotation in a clockwise direction would be 450°−135°=315°. In this particular example, the cooking time (second parameter) is set to a value that is based on and proportional to the net angular rotation in a clockwise direction, where 360° of net angular rotation is equivalent to 60 minutes. Thus, in the above example, the cooking time would be set to 45 minutes i.e., (60 minutes*315°/360°.) Using the above method, a user can specify longer times by moving the contact point 205 more than once around the reference point 210 (e.g., moving the contact point 720° around the reference point 210 causes 2 hours to be added to the timer.)

The device 260 optionally may display a particular graphical indicator or effect to highlight the longer time period. In the illustrated embodiment of FIG. 7B, for example, when the user moves the contact point once (i.e., 360°) around the reference point 210, the device detects the motion and in response displays a circle 720. The circle 720, which encircles the contact point 205 and the reference point 210, is a visual reminder to the user of the addition of 60 minutes to the cooking time (second parameter.) In some approaches, the device 260 displays an additional concentric circle for every time the user moves the contact point 205 360° around the reference point 210 (e.g., 720° of net angular rotation around the reference point 210 would cause the device 260 to display two concentric rings and would cause the time to be increased by 2 hours, etc.) In various other embodiments, other graphical effects are used to indicate the above contact point movements (e.g. displaying a star, a checkmark or any other suitable indicator for every 360° of net angular rotation, etc.)

Figure 8:
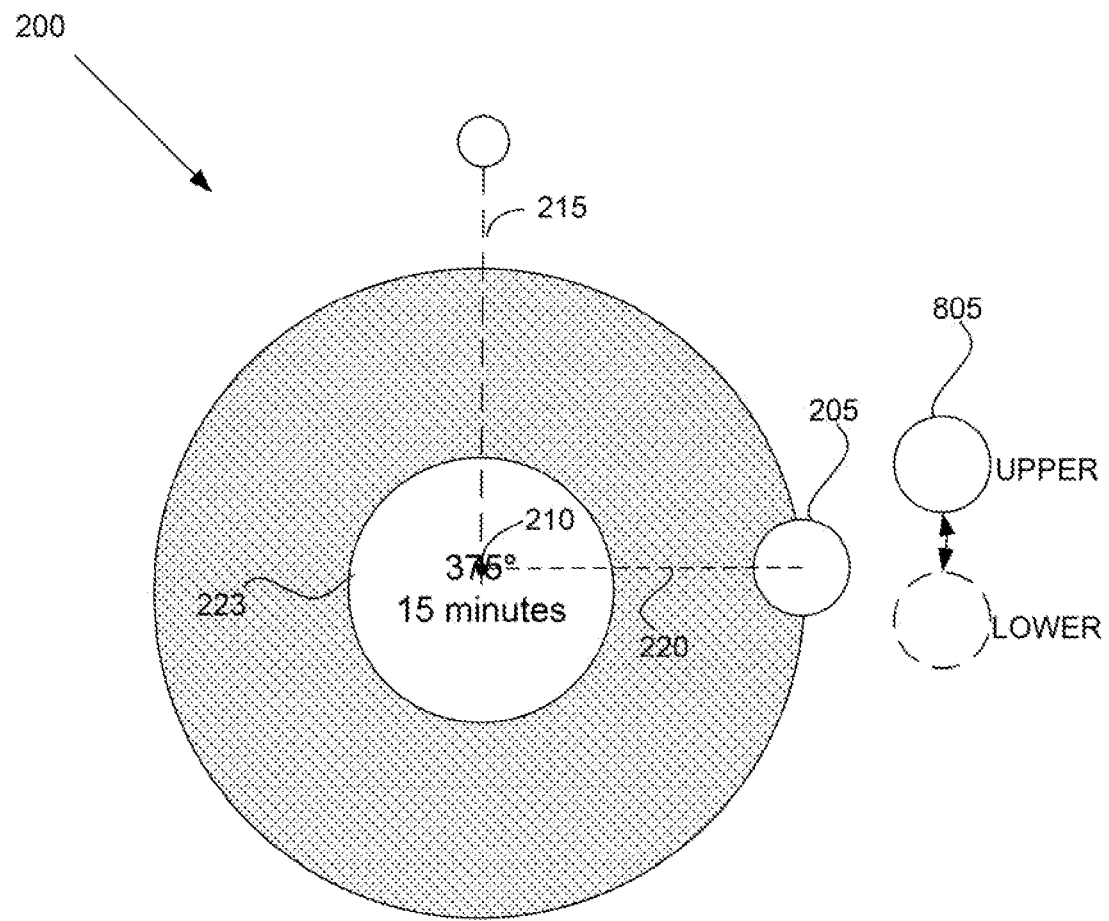
FIG. 8 is a diagram of an interface used to adjust an additional parameter according to a particular embodiment of the present invention.

Referring next to FIG. 8, an example method for using an interface 200 to adjust three different parameters will be described. FIG. 8 includes a graphical user interface 200 that may have the features and functionality of any interface illustrated in FIGS. 1-7B. The interface 200, which is displayed at a device 260 (e.g., an oven), includes an information panel 223, a base line 215, a contact line 220, a contact point 205 and a reference point 210.

In the illustrated embodiment, a user moves the contact point 205 to a position shown in FIG. 8. As previously described in connection with steps 105, 110 and 115 of FIG. 1, the device 260 detects the motion and adjusts first and second parameters accordingly. In this example, the device sets a first parameter (e.g., cooking temperature) to 375° and the second parameter (e.g., cooking time) to 15 minutes.

In this example, while the user touches the display to maintain contact point 205, at the same time the user touches the display screen 250 in a nearby location, thereby making a second contact point 805. This may be done in any suitable manner. In some implementations, for example, the user holds one finger on the interface 200 to generate contact point 205 and another finger (of the same or different hands) to create the second contact point 805. That is, the user comes in contact with the interface 200 at those two locations simultaneously.

The device 260 detects these two contact points 205/805, and determines that the user wishes to adjust a third parameter using the second contact point 805. The third parameter may be any suitable parameter, including but not limited to notifications, oven compartments, time, temperature, mass, weight, etc. In some implementations, the second contact point 805 can be moved to one of multiple predetermined positions, each of which is associated with a different value for the third parameter. The device 260 detects the movement or position of the second contact point and, in response, the device 260 adjusts the third parameter.

One example implementation may be described as follows. A user uses a finger of his or her hand to move the first contact point 205 so that the cooking temperature and time of an oven are set to 375° and 15 minutes, respectively, as shown in FIG. 8. The oven has two cooking compartments, an upper compartment and a lower compartment. The user now wishes to provide input to the oven to indicate which compartment the first and second parameters should be applied to. The user then creates a second contact point 805 (e.g., by touching a region near the first contact point with a different finger of the same hand.) The user moves the second contact point 805 to one of two positions, as shown in the figure. Each position is associated with a different compartment. The device detects the movement and/or position of the second contact point 805 and adjusts the third parameter accordingly i.e., in this example, since the user has moved the second contact point to the upper position as seen in the figure, the device 260 applies the selected cooking time and temperature to the upper compartment, as described in step 120 of FIG. 1.

Although in the above example, the third parameter refers to a particular oven compartment, it should be appreciated that the third parameter may refer to any suitable feature or selectable set of options. In some embodiments, for example, the third parameter is a notification setting. That is, in the above example, a user can move the second contact point to one of two positions. One of the positions indicates a desire to receive notifications (e.g., via email, text or some other notification system.) The other position indicates that notifications should not be sent. The notification may indicate various types of information, including but not limited to a message indicating that the cooking time period has expired. The device 260 detects the movement and/or position of the second contact point 805 and later transmits or does not transmit the notification accordingly.

Figure 9A:
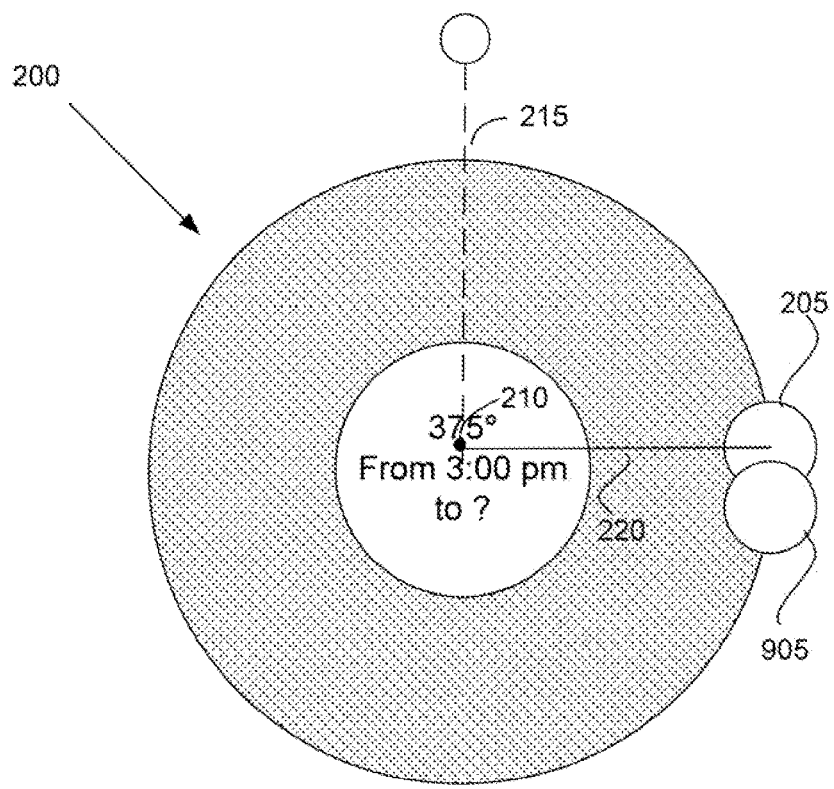
FIGS. 9A and 9B are diagrams of an interface used to set a time period according to a particular embodiment of the present invention.
Figure 9B:
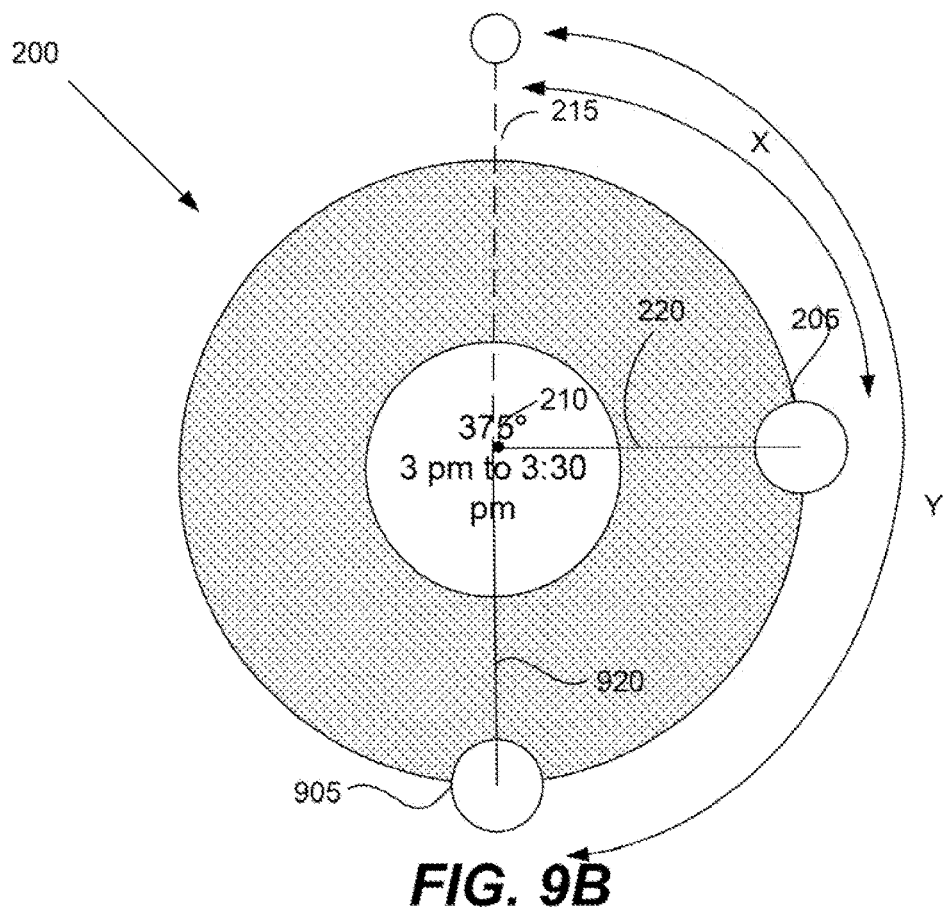

Referring next to FIG. 9A-9B, a method for setting a time period according to a particular embodiment of the present invention will be described. FIG. 9A illustrates an interface 200 that is implemented on a device 260 and may have the features and functionality of any interface illustrated in FIGS. 1-8. The interface 200 includes a first contact point 205, an associated contact line 220, a base line 215 and a reference point 210. The interface 200 is displayed on a device 260, which in this example is an oven, but any other suitable device may be used.

In the illustrated example, a user wishes to bake a dish at 375° from 3:00 pm to 6 pm. To do this, the user provides input to the device 260 indicating that the input of a future time period is desired (e.g., a time period that begins at a specified time or date.) The device 260 receives the input and in response, prepares to detect a second contact point 905. The positions of contact points 205 and/or 905 may be highlighted by associated contact markers, which the user can separately move to change the positions of the contact points.

The user understands that the circular design of the interface 200 in this example reflects the time increments of a typical clock face i.e., 360° around the reference point 210 equates to 12 hours of time. Accordingly, to set a starting time of 3:00 pm, the user moves the first contact point 205 to the 3:00 position. Additionally, to indicate a desired cooking temperature, the user moves the first contact point 205 some distance away from reference point 210. Accordingly, the device 260 detects this distance and adjusts the cooking temperature to 375° (e.g., step 110 of FIG. 1)

As seen in FIG. 9B, to set an ending time of 6:00 pm, the user moves the second contact point to the 6:00 position. The first and second contact points 205/905 are associated with contact lines 220 and 920, respectively. These positions result in the angles between the first and second contact lines 220/920 and the base line 215 being 90° and 180°, respectively. Put another way, in this example, the starting time for the desired time period is based on angle X, which is between the first contact line 220 and the base line 215. The ending time for the desired time period is based on angle Y, which is between the second contact line 920 and the base line 215.

The device 260 detects the movement of the first and second contact points 205/905 to the aforementioned positions. Based on such movement, angles X and Y the device 260 sets the cooking time accordingly i.e., between 3:00 pm and 6:00 pm. The user then provides input indicating that the above cooking settings should be executed. In response, the device 260 heats its cooking compartment to 375° from 3:00 pm to 6:00 pm (e.g., step 120 of FIG. 1.)

It should be appreciated that the above example includes various details that need not be included in every implementation of this method. In some embodiments, for example, the position of the contact points translate into different time settings i.e., rather than a time period from 3 pm to 6 pm, the above movement and positioning of the contact points could indicate a desire for a time period of 15 minutes, which begins 15 minutes from now, since 360° around the reference point 210 is understood to equate to 60 minutes. Various implementations involve the contact points being visible on the display in the form of contact markers. The user can then position the two contact markers and more easily remember what the starting and end points for the time period are.

Figure 10:
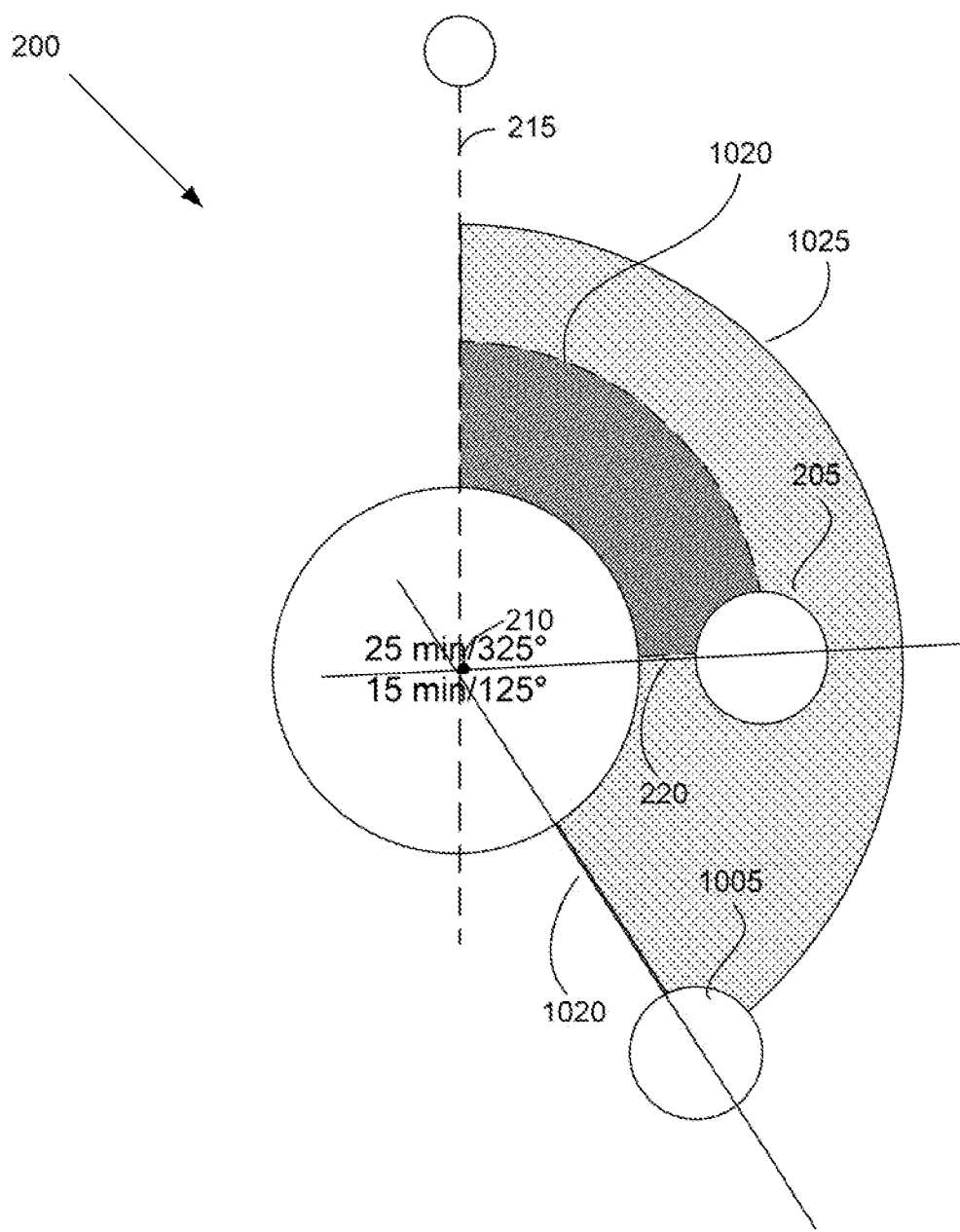
FIG. 10 is a diagram of an interface used to adjust multiple parameters using multiple contact points according to a particular embodiment of the present invention.

Referring next to FIG. 10, a method for controlling two different features using an interface 200 will be described. FIG. 10 is an interface 200 that includes first and second contact points 205/1005 (and associated contact lines 220/1020), a reference point 210 and a base line 215. The interface 200 may include the features and functionality of any interface of FIGS. 1-9B. The interface may be displayed on any suitable device (e.g., an oven, a smart phone, a computer, etc.) In the illustrated example, the device 260 is an oven.

A user may operate the interface generally exactly as described in method 100 of FIG. 1, except that there are two distinct contact points 205/1005, which each are used to adjust parameters for different features. A feature may be any compartment, function or operation in the device. In the illustrated embodiment, for example, the movement of the first contact point 205 controls first and second parameters (e.g., temperature and time) for an upper heating compartment of an oven. The movement of the second contact point 1005 controls third and fourth parameters, which are used to adjust temperature and time, respectively, for a lower heating compartment of the oven.

Otherwise, the device 260 detects movements of the contact points and adjusts the parameters as discussed in method 100 of FIG. 1. That is, a user can move the first contact point 205 around and away from the reference point 210. The device 260 detects the movements of the first contact point 205 and adjusts the first and second parameters (e.g., temperature and time) for the upper heating compartment accordingly e.g., as discussed in steps 105-120 of FIG. 1. Similarly, the user can move the second contact point 1005 around and away from the reference point 210. The device 160 detects the movements of the control and adjusts the third and fourth parameters (e.g., temperature and time) for the lower heating compartment accordingly e.g., as discussed in steps 105-120 of FIG. 1.

The interface 200 may include various graphical effects that help distinguish the parameters being set for the two different features. In some implementations, for example, there is a reference circle associated with each contact point 205/1005 whose center is the reference point 210. The radius of the reference circle is or is based on the associated contact line 220/1020. Each contact point 205/1005, its associated contact line 220/1020, associated reference circle and/or the base line 215 help define a periphery or boundaries of a feature region (e.g., shaded feature regions 1020 and 1025 in FIG. 10.) Thus, each contact point 205/1005 and feature is associated with a different feature region 1020/1025. In various embodiments, the feature region 1020/1025 dynamically grows and shrinks based on the movement of the associated contact point 205/1005. As show in the figure, the feature regions may be shaded or colored differently. Additionally or alternatively, they may have some degree of transparency, so that the parameter settings desired for each contact point are more readily distinguishable.

In some embodiments, the direction that a contact point is moved may have a different effect on the associated parameter(s). For example, in the illustrated embodiment, the device 260 uses the angle between the first contact line 220 and the base line 215 to determine a time setting for the upper compartment (e.g, step 115 of FIG. 1.) The device 260 uses the angle between the second contact line 1020 and the base line 215 to determine a time setting for the lower compartment. For both determinations, the angle is measured along a clockwise direction. However, in some embodiments, one or both of the angles for the first and second contact lines may instead be measured in a counter-clockwise direction.

Figure 11:
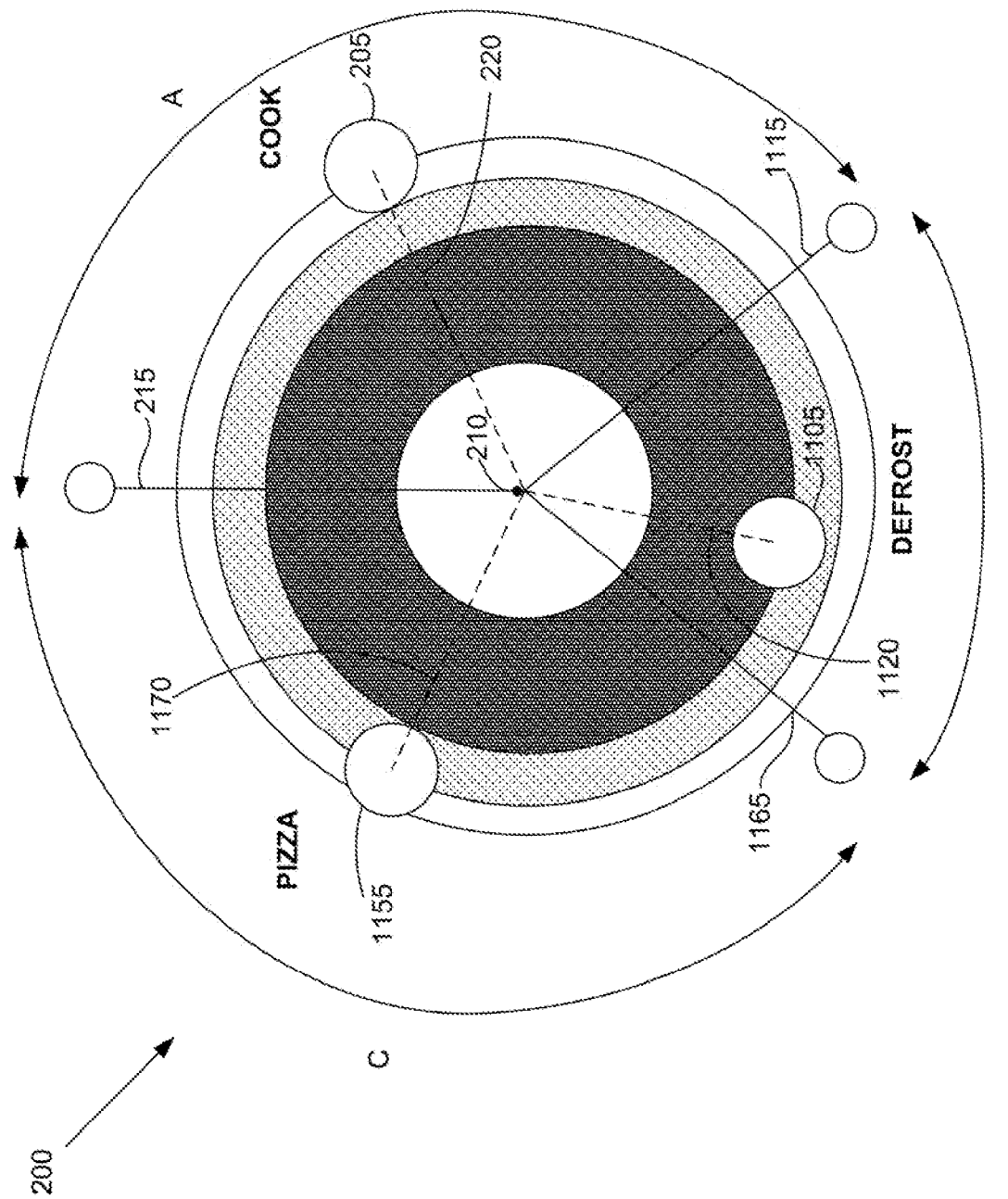
FIG. 11 is a diagram of an interface used to adjust parameters for multiple features according to a particular embodiment of the present invention.

Referring next to FIG. 11, a method for controlling multiple features using an interface 200 will be described. FIG. 10 illustrates an interface 200 that includes three different base lines (i.e., a first base line 215, a second base line 1115, and a third base line 1165) and associated contact points and lines (i.e., a first contact point 205 and contact line 220, a second contact point 1105 and contact line 1120 and a third contact point 1155 and contact line 1170.) The interface 200 further includes a reference point 210. The interface 200 may be displayed on any suitable device (e.g., an oven, a smart phone, a computer, etc.) In the illustrated example, the device 260 is a microwave oven.

The interface 200 has three distinct sections (A, B and C). Each section is associated with a different feature of the device 260 and with a different one of the contact points, contact lines and base lines. In the illustrated embodiment, for example, the first contact point 205, first contact line 220 and first base line 215 are associated with section A, which controls general microwave cooking settings. The second contact point 1105, second contact line 1120 and second base line 1115 are associated with section B, which controls defrost settings. The third contact point 1155, third contact line 1155 and third base line 1165 are associated with section C, which controls pizza cooking settings. Each section covers a different range of angles around the reference point 210 e.g., each section corresponds to a "slice" or "wedge" of a circle whose center is at the reference point 210. The user moves each of the contact points in the associated section to control one or more parameters for the associated feature.

The device 260 detects the movement of each contact point within each section and adjust one or more parameters for the associated feature accordingly, as previously discussed in connection with method 100 of FIG. 1. Thus, a user who wishes to microwave food can move the first contact point 205 within section C. The device 260 detects the movement and adjusts a first parameter (e.g., microwave power level) based on the distance of the first contact point 205 from the reference point 210 (e.g., step 110 of FIG. 1.) The device 260 also adjusts a second parameter (e.g., cooking time) based on the angle between the contact line 220 and the first base line 215 (e.g., step 115 of FIG. 1,)

It should be noted, however, that the different sections may involve different types or numbers of parameters. Additionally, adjustments to parameters for a feature are based on the particular contact point, contact line and base line for the associated section. By way of example, in FIG. 11, the pizza cooking section C is used to control only one parameter, time. Thus, when the user moves the third contact point 1155, which is associated with the pizza cooking section C, the device 260 adjusts the cooking time based on the angle between the third contact line 1170 and the third base line 1165. In this example, the distance between the third contact point 1155 and the reference point 210 is not used to adjust another pizza cooking-related parameter. In some embodiments, to emphasize this, the associated third contact point 1155 is visually represented by a contact marker that can only be moved along an arc, such that the distance between the contact marker/point and the reference point 210 does not change as the marker is moved along the arc between the third base line 1165 and the first base line 215.

In the different sections of the interface 200, different types of parameters may be adjusted using their respective contact points. In section B (defrost), for example, a user can move the second contact point 1105 to adjust a first parameter (weight of food to be defrosted) and a second parameter (defrost time.) The device 260 detects the movement of the second contact point 1105, adjusts the first and second defrost parameters, and then implements the defrost parameters accordingly (e.g., as described in connection with method 100 of FIG. 1.)

There may be a variety of optional visual effects in the interface 200. In various embodiments, each section is associated with a feature region, which may be distinctly shaded or colored as described in connection with FIG. 10. Each contact point may be visually represented by a contact marker, which may have any suitable form or shape.

Some implementations restrict the control of a particular feature to a corresponding section of the interface 200. In the illustrated embodiment, for example, the adjustment of parameters for a particular feature (e.g., general microwave cooking, defrost, pizza cooking) are based only on contact point movement that takes place within the associated section (e.g., sections A, B and C, respectively.) Put another way, when adjusting defrost parameters, the device 260 does not take into account contact point movement in sections A and C.

Figure 12:
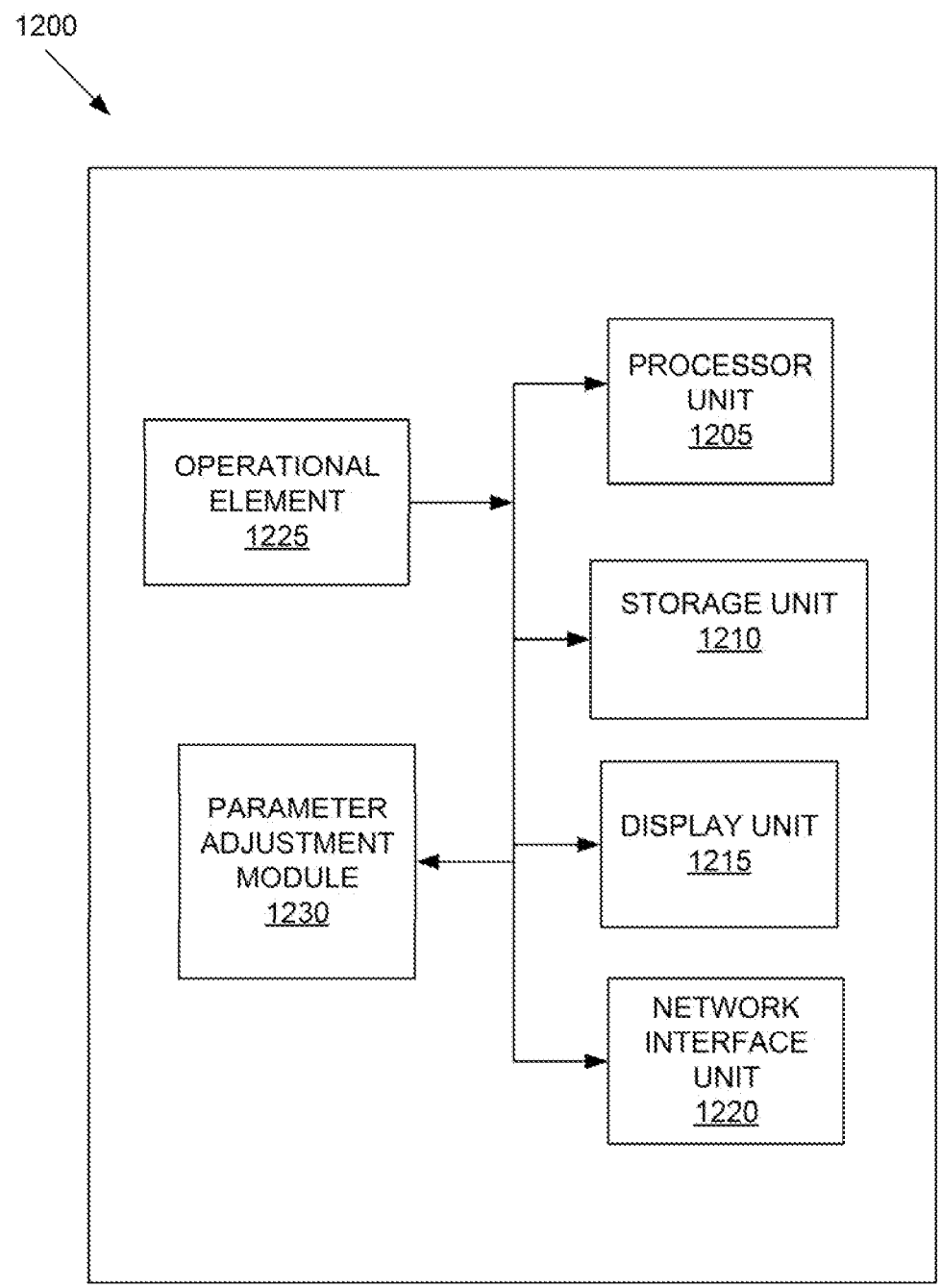
FIG. 12 is a block diagram of a device according to a particular embodiment of the present invention.

Referring next to FIG. 12, a device 1200 according to a particular embodiment of the present invention. The device may be any device described in connection with FIGS. 1-11 (e.g., device 260 of FIG. 2) In various examples described herein, the device 1200 is an oven (electric and/or gas) or a microwave oven. However, the device 1200 may be an suitable type of appliance or device, including but not limited to a phone, a computer, a laptop, a consumer electronic product, a tablet, etc. The device 1200 includes a processor unit 1205 having one or more processors, a storage unit 1210, a display unit 1215, a network interface unit 1220, a parameter adjustment module 1230, and an operational element 1225.

The storage unit 1210 is any hardware or software suitable for storing data or executable computer code. The storage unit 1210 can include but is not limited to a hard drive, flash drive, non-volatile memory, volatile memory or any other type of computer readable storage medium. Any operation or method described herein for a device (e.g., an oven or microwave oven, device 260, etc.) may be stored in the form of executable computer code or instructions in the storage unit 1210. The execution of the computer code or instructions by the processor unit 1205 causes the device 1200 to perform any of the aforementioned operations or methods.

The display unit 1215 is any hardware or software for displaying information and/or receiving input from a user. In some embodiments, the display unit includes a display/video screen on the device. Any suitable form of display technology may be used, including but not limited to an LCD or OLED screen, a touch-sensitive capacitive screen, e-ink screen and/or any other known type of display. The display unit is arranged to display any interface described in this application (e.g., FIGS. 1-11.) In various embodiments, the screen is arranged to be touch sensitive. By way of example, a user may touch the screen (e.g., with a finger, stylus or other mechanism) to provide input to the device 1200 as described herein. The device 1200 detects the contact point caused by this touching and, as described in connection with the above figures, adjusts one or more parameters based on the movement and/or position of the contact point (e.g., method 100 of FIG. 1) In some implementations, a device can detect two or more separate contact points. These contact points may result from the simultaneous touching by the user of two discrete points on the display. Alternatively or additionally, the user may touch the screen at one time, causing and moving a contact point, and then touch the screen in a different location at a different time, causing and moving a second contact point. The device 1200 is arranged to detect these multiple contact points and adjust parameters or perform operations accordingly.

The operational element 1225 is any hardware or software for performing a feature or operation for the device (e.g., as described in connection with step 120 of FIG. 1.) The operation is performed using one or more parameters provided by the user (e.g., as described in connection with steps 105, 110 and 115 of FIG. 1 and any other figures of this application.) By way of example, some of the figures described herein relate to the adjustment of parameters for an oven (e.g., cooking temperature and time.) In various implementations, the operational element thus includes one or more heating compartments (e.g., an upper and a lower heating compartment.) The element further includes, in each compartment, a heating element. When the device 1200 receives input from the user and adjusts the cooking temperature and time (e.g., steps 105-115 of FIG. 1), the device 1200 then operates the appropriate heating compartment and heating element based on the adjusted parameters. That is, in some implementations, heat is generated at the heating element such that air temperature in the compartment rises to the designated cooking temperature. The heating is maintained for a time period equal to and/or based on the time parameter set by the user. In other implementations involving different types of operations and parameters (e.g., microwave cooking), the operational element includes any structures or mechanisms that would make use of the parameters to accomplish a desired goal of the user (e.g., any heating element or equipment used to microwave food.)

The parameter adjustment module 1230 is any hardware or software arranged to perform any of the operations or methods described in this application that involve the adjustment of parameters (e.g., steps 110 and 115 of FIG. 1) In various embodiments, the parameter adjustment module 1230 is arranged to cause the device 1200 to detect one or more contact points, adjust a parameter based on a distance between a reference point and a contact point and adjust a second parameter based on an angle between a base line and a contact line (e.g., as described in connection with method 100 of FIG. 1.) In various embodiments, the parameter adjustment module 1230 is also arranged to detect other types of contact point movement and adjust one or more parameters accordingly e.g., as described in connection with FIGS. 1-12.

The network interface unit 1220 includes any hardware or software suitable for enabling the device to communicate with an external device. In some embodiments, for example, a user uses an interface displayed on a display device, which may be but is not limited to a mobile phone, a computer or a computer tablet. The display device uses a network interface unit 1220 to transmit user input or user preferences (e.g., adjusted parameters and/or contact point movement/position data, as described in the figures) to an implementation device. The implementation device also includes a network interface unit 1220 that receives the input and performs an operation based on the parameters (e.g., step 120 of FIG. 1.) To use a simple example, a user may use a smart phone or tablet to manipulate an interface as described herein, and transmit parameter-related data to an oven, which then starts heating a compartment to a particular temperature and for a time period based on the input. The features and functionality of device 1200 thus may be divided between the implementation device and the display device. The network interface unit 2015 is arranged to transmit data and receive data using any suitable network (e.g., LAN, Internet, etc.) or communications protocol (e.g., Bluetooth, WiFi, NFC, IEEE 802.15.4, IEEE 802.11, etc.)

Various embodiments described herein involve distinct features. It should be appreciated that any feature or functionality from one figure or embodiment may be incorporated into any other figure or embodiment. By way of example, the embodiment illustrated in FIG. 10 involves a feature region that is filled in, colored and/or shaded. This graphical effect can be used in any of the described embodiments. Thus, the interface illustrated in FIG. 4 may also include a feature region whose periphery is defined at least in part by a base line, a contact line and a reference circle whose radius is the distance between the contact point and the reference point. Alternatively or additionally, the interface may include a circle or circle-like shape that is shaded, colored and/or helps define the boundary of a region in which the contact point/marker can move. In some implementations, the radius of the circle is based on or is equal to the distance between reference point and the contact point.

Various examples described herein involve a user who manipulates a display on a device. The device detects the input from the user, adjusts one or more parameters based on the input (e.g., based on contact point movement), and then performs an operation based on the adjusted parameter(s) (e.g., method 100 of FIG. 1.) It should be noted that the application also contemplates embodiments in which any number of these functions and features are divided between two devices. By way of example, in some embodiments, there may be a display device and an implementation device. The display device may be but is not limited to a tablet, laptop, mobile phone or any other computing device. The implementation device may be but is not limited to an oven, a microwave oven or any suitable appliance, device or machine. The display device performs step 105 of FIG. 1, and possible steps 110 and 115 of FIG. 1. The display then transmits the contact point movement/position data and/or adjusted parameter data (if steps 110 and 115 were performed a the display device) to an implementation device. Based on the received data, the implementation data performs steps 110-115 of FIG. 1 (if not already done by the display device) and/or step 120. Any of the operations described herein involving an interface and receiving contact point input from a user may be performed at the display device; any of the operations described herein relating to adjusting parameters based on the input may be performed at the display device and/or the implementation device. The implementation device also performs desired operations (e.g., cooking food using settings based on the adjusted parameters) and receives any data necessary to perform the operations from the display device.

There are various references in this application to the movement of a contact point. This may refer to a variety of different operations. In some embodiments, this means that a user has dragged a finger or structure (e.g., a stylus) across the display along the entire distance between the two contact points; in other embodiments, the user touched the display at the first contact point, broke contact with the display, and then touched the display at a second contact point. Additionally or alternatively, contact point movement may also refer to the movement of a contact marker. That is, the user has applied a finger or structure to a contact marker displayed on the display, and has "dragged" the contact marker to a different location. In various embodiments, the device is arranged to display the movement of the marker such that the marker only moves when the marker is dragged i.e., is in continuous contact with a finger or structure. In some but not all embodiments, the marker does not move if the user touches a location on the display where a marker is not present and/or if the marker is not moved, the parameters are not adjusted.

Although only a few embodiments of the invention have been described in detail, it should be appreciated that the invention may be implemented in many other forms without departing from the spirit or scope of the invention. For example, the present application and figures describe various methods (e.g., method 100 of FIG. 1, any method or operation described in connection with FIGS. 2-11, etc.). It should be appreciated that in some embodiments, one or more of these operations/steps may be modified, reordered and/or deleted. Additionally, various figures, such as FIGS. 2-12 describe devices or interfaces that contain various components. It should be noted that in some embodiments, one or more of these components may be merged together. In still other embodiments, one or more components may be separated into a greater number of components. The features of one component may be transferred to another and/or modified as appropriate. Each device may have additional components beyond what is shown in the corresponding figure. Therefore, the present embodiments should be considered illustrative and not restrictive and the invention is not to be limited to the details given herein.

What is claimed is:

1. A method for adjusting at least two parameters using a graphical user interface, the method comprising:
   detecting a first contact point on a touch sensitive display coupled with a device;
   determining a distance between a reference point on the touch sensitive display and the first contact point;
   determining an angle between a first base line and a first contact line;
   adjusting a value of a first parameter within a group of parameters based on the distance;
   adjusting a value of a second parameter within the group of parameters based on the angle, wherein:
      the first base line is a reference line on the touch sensitive display that extends from the reference point, and
      the first contact line is a reference line on the touch sensitive display that connects the first contact point with the reference point;
   performing an operation by the device based upon the values of the first and second parameters; and
   in response to the first contact point located at a border of a movement region, altering an operational mode of the device, wherein the first parameter includes the operational mode when the first contact point is located at the border of the movement region.

2. The method of claim 1, wherein:
   the device is an oven;
   the first parameter is temperature;
   the second parameter is time; and
   the method further comprises:
      raising a temperature of air in a heating compartment of the oven to the adjusted temperature; and
      setting a timer based on the adjusted time.

3. The method of claim 1, further comprising:
   detecting a second contact point on the touch sensitive display; and
   based on the second contact point, determining a third parameter.

4. The method of claim 3, wherein the first and second contact points are disposed in close proximity to one another to enable the first and second contact points to be performed by two fingers of a hand.

5. The method of claim 1, further comprising:
   displaying a graphical interface including a plurality of sections including a first section, each section of the plurality of sections covering a different range of angles around the reference point wherein:
      the plurality of sections is associated with a plurality of different features for the device, respectively;
      the first section is associated with a first feature of the plurality of different features;
      the first contact point is positioned within the first section;
      the first base line is at a periphery of the first section; and
      the first and second parameters are control parameters for the first feature.

6. The method of claim 5, further comprising:
   detecting a second contact point on the touch sensitive display wherein the second contact point is within a second section of the plurality of sections, the second section being associated with a second feature of the plurality of different features;
   adjusting a value of a third parameter within the group of parameters based on a distance between the reference point and the second contact point;
   adjusting a value of a fourth parameter within the group of parameters based on an angle between a second base line and a second contact line wherein:
      the second base line is a reference line on the touch sensitive display that extends from the reference point and that is at a periphery of the second section; and
      the second contact line is a reference line on the touch sensitive display that connects the second contact point with the reference point.

7. The method of claim 5, wherein the device is a microwave oven and the plurality of different features associated with the plurality of sections each involve one of 1) a general cooking mode; 2) a defrost mode; 3) a pizza cooking mode; 4) a meat cooking mode; 5) a popcorn cooking mode; and 5) a reheat mode.

8. The method of claim 1, further comprising:
   displaying at least part of a circular region whose radius changes in length depending on the distance between the reference point and the first contact point.

9. The method of claim 1, further comprising:
   displaying a shaded region whose borders are defined at least in part by the first contact line and the first base line.

10. The method of claim 1, further comprising:
    detecting a second contact point on the touch sensitive display;
    adjusting a value of a third parameter within the group of parameters based on a distance between the reference point and the second contact point; and
    adjusting a value of a fourth parameter within the group of parameters based on an angle between the first base line and a second contact line wherein the second contact line is a reference line on the touch sensitive display that connects the second contact point with the reference point.

11. The method of claim 10, wherein:
    the device is an oven;
    the first parameter is a first temperature;
    the second parameter is a first time;
    the third parameter is a second temperature;
    the fourth parameter is a second time;
    the method further comprises:
    raising a temperature of a first heating compartment of the oven to the adjusted first temperature;
    heating the first heating compartment for a time period based on the adjusted first time;
    raising a temperature of a second heating compartment of the oven to the adjusted second temperature; and
    heating the second heating compartment for a time period based on the adjusted second time.

12. The method of claim 1, further comprising:
    displaying a contact marker, the contact marker indicating a location of the first contact point on the display; and
    moving the contact marker when the contact marker is touched and dragged by a user wherein the adjustment of the first and second parameters is based on the movement of the contact marker relative to the reference point on the display.

13. The method of claim 1, wherein the second parameter is a time period, the method further comprising:

detecting that the first contact point has moved 360° around the reference point; and in response to the detection of the 360° movement of the first contact point, adding 60 minutes to the time period.

14. The method of claim 13, further comprising:

in response to the detection of the 360° movement of the first contact point, displaying a circle around the reference point to indicate the 360° movement and the addition of 60 minutes.

15. A non-transitory computer readable medium including a plurality of instructions that, when executed by at least one processor, are configured to cause the at least one processor to:

detect a first contact point on a touch sensitive display coupled with a device;

determine a distance between a reference point on the touch sensitive display and the first contact point;

determine an angle between a first base line and a first contact line;

adjust a value of a first parameter within a group of parameters based on the distance;

adjust a value of a second parameter within the group of parameters based on the angle, wherein:

the first base line is a reference line on the touch sensitive display that connects to and extends from the reference point, and the first contact line is a reference line on the touch sensitive display that connects the first contact point with the reference point;

perform an operation by the device based upon the values of the first and second parameters; and in response to the first contact point located at a border of a movement region, alter an operational mode of the device, wherein the first parameter includes the operational mode when the first contact point is located at the border of the movement region.

16. The non-transitory computer readable medium of claim 15, wherein:

the device is an oven;

the first parameter is temperature;

the second parameter is time; and the plurality of instructions is further configured to cause the at least one processor to:

raise a temperature of a heating compartment of the oven to the adjusted temperature; and heat the heating compartment of the oven for a time period based on the adjusted time.

17. The non-transitory computer readable medium of claim 15, wherein the plurality of instructions is further configured to cause the at least one processor to:

detect a second contact point on the touch sensitive display; and determine a third parameter within the group of parameters based on the second contact point.

18. A device comprising:

a touch sensitive display; and at least one processor configured to:

detect a first contact point on the touch sensitive display, determine a distance between a reference point on the touch sensitive display and the first contact point, determine an angle between a first base line and a first contact line, adjust a value of a first parameter within a group of parameters based on the distance, and adjust a value of a second parameter within the group of parameters based on the angle, wherein:

the first base line is a reference line on the touch sensitive display that extends from the reference point; and the first contact line is a reference line on the touch sensitive display that connects the first contact point with the reference point;

perform an operation by the device based upon the values of the first and second parameters; and in response to the first contact point located at a border of a movement region, alter an operational mode of the device, wherein the first parameter includes the operation mode when the first contact point is located at the border of the movement region.

19. The device of claim 18, further comprising:

a heating compartment;

a heating element inside the heating compartment wherein:

the device is an oven;

the first parameter is temperature;

the second parameter is time; and the at least one processor is further configured to:

heat the heating element such that temperature of air in the heating compartment reaches the adjusted temperature wherein the heating element is heated for a time period based on the adjusted time.

20. The device of claim 18, the at least one processor is further configured to:

detect a second contact point on the touch sensitive display; and based on the second contact point, determining a value of a third parameter within the group of parameters.

* * * * *